United States Patent [19]

Sudo et al.

[11] 4,183,592
[45] Jan. 15, 1980

[54] SEALED ROLLING BEARING

[76] Inventors: Kyosuke Sudo, No. 306 Kyodo Bldg., 7 Ban, Kameino, Fujisawa-shi, Kanagawa-ken; Hisao Hasunuma, No. 25, 3 Ban, 2 chome, Kawana, Fujisawa-shi, Kanagawa-ken; Takahiro Yamaoka, 3-81, Nishi-Uraga-machi, Yokosuka-shi, Kanagawa-ken; Shigeru Sagae, 1250-10, Terao, Yanasa-machi, Koza-gun, Kanagawa-ken, all of Japan

[21] Appl. No.: 906,160

[22] Filed: May 16, 1978

[30] Foreign Application Priority Data

May 13, 1977 [JP] Japan .................................. 52-54214
Mar. 24, 1978 [JP] Japan .................................. 53-32883

[51] Int. Cl.² .......................................... F16C 33/78
[52] U.S. Cl. .................................... 308/187.2; 277/94
[58] Field of Search .................. 308/187.1, 187.2, 187, 308/36.1, 36.5; 277/94, 95; 29/148.4

[56] References Cited
U.S. PATENT DOCUMENTS 2,639,954  5/1953  Potter ............................... 308/187.2

FOREIGN PATENT DOCUMENTS 2002981  9/1970  Fed. Rep. of Germany ........ 308/187.2
580435  9/1946  United Kingdom .................. 308/187.2

*Primary Examiner*—Douglas C. Butler
*Attorney, Agent, or Firm*—Basile and Weintraub

[57] ABSTRACT

The marginal periphery of a locking side of an annular sealing ring is bent along an axial direction of the sealing ring to form a peripheral wall being chamfered at its peripheral edge. An annular sealing groove or grooves for receiving and retaining the annular sealing ring is formed either on an outer race or inner race of a rolling bearing. A retaining surface of the annular sealing groove is formed with a straight or curved profile and extends obliquely away from the central axis of the sealing ring toward the interior of the sealing ring body. Due to this construction, a chamfered portion of the sealing ring easily and resiliently deforms when it is merely pushed into the sealing groove or is tightened further by wedging or caulking, thus, enabling easy and firm assembly of the sealing ring without any appreciable deformation of the outer race or inner race which receives and retains the sealing ring.

11 Claims, 8 Drawing Figures

SEALED ROLLING BEARING

BACKGROUND OF THE INVENTION

1. Field of the Invention

This invention relates to a sealed rolling bearing such as a ball bearing or a roller bearing sealed by one or a pair of metallic seal rings, which comprise not only those made entirely of metal plate but those rings the marginal portion of which are to be fitted to the sealing groove which are made of metal plate, for example, a sealing ring having a sealing lip at the portion opposite to its retaining side. More particularly, this invention relates to an improved sealing ring and a sealed rolling bearing utilizing this type of sealing ring which enables maintainance of a minimum extent of deformation and dimensional change, particularly, deformation of the circularity of the outer race or inner race due to an assembly operation.

2. Prior Art

Means for retaining seal rings in sealed bearing, are known in the art. For example, U.S. Pat. No. 3,206,262 teaches each sealing ring being fixed or fitted to a sealing groove by means of a resilient seal retaining snap ring. Other prior art, such as, U.S. Pat. Nos. 2,355,805; 2,850,792 and 3,203,740, teach sealing rings being inserted directly into a sealing groove by force fitting or with further wedging. However, these prior art references have several drawbacks which it is desired to eliminate.

For example, retaining snap rings may cause only a relatively small extent of deformation and dimensional change of the bearing race due to inserting and fitting of the sealing ring, and, thus, may be more advantageous than the force fitting method with respect to dimensional accuracy. However, snap rings require a complicated configurations of the sealing groove along with preparation of extra retaining snap rings, as well as requiring improving machining and assembling efficiency, productivity, as well as in expensive production costs.

Also, there are encountered other problems with respect to the sealing performance due to variations in the sealing clearance formed, for instance, between the inner peripheral edge of the seal ring and the outer surface of the stepped portion of the inner ring. This is brought about by such inherent features of this type of fixing means that there remains only a minimum clearance necessary for assembly operation between the peripheral edge of the free side of the seal ring and the stepped surface of the inner race, and accordingly, there may arise variations in the clearance. This is liable to cause an undesirable metal to metal contact between a sealing ring and an inner race when the clearance is excessively small. Therefore, this type of fixing or fitting of the sealing ring has been found to be too difficult for application to small size bearings or miniature bearings.

On the other hand, in the latter type of fixing or fitting, both the sealing ring and the sealing groove formed in the outer or inner bearing race are of simple confirurations and their assembly can be performed by a mere force fitting or with further wedging, and therefore, is somewhat more advantageous with respect to productivity, assembling work and production costs.

However, the peripheral portion of the sealing ring is press formed and has the same thickness throughout the entire ring body. Consequently, there inevitably arises considerable deformation and dimensional change in the bearing race due to the wedging operation as well as uneven locking of the sealing ring to the sealing groove due to the deformation and/or dimensional variation. In other words, the larger the applied wedging force for preventing the uneven locking the larger is the deformation of the outer race. On the contrary, if the wedging is carried out with such a lower force that no substantial deformation is caused, there, arises another problem that the loosely wedged sealing rings may rotate during their service.

As explained above, it has been proved to be excessively difficult up to the present, to maintain deformations and dimensional change of the bearing race to be as small as possible and to firmly retain the sealing ring such that it may not rotate.

Particularly, a fatal drawback of the force type of fixing was the fact that it has been applied to almost none of the bearings having bearing races of small wall thickness, extra small bearings or miniature bearings.

OBJECTS OF THE INVENTION

In view of the above mentioned drawbacks of the conventional sealed rolling bearings, it is therefore, an object of this invention to provide sealed rolling bearings free from such drawbacks, and particularly, to provide a sealing ring retaining construction and a sealed rolling bearing utilizing this sealing ring which can be applied to extra small bearings and miniature bearings using bearing races of small wall thickness.

In this regard, this invention is directed to assembling and securing a sealing ring or sealing rings of a sealed rolling bearing to a bearing race thereof without causing any substantial deformation thereof.

It is a further object of this invention to provide a sealing ring which can be assembled easily and in a secured manner.

It is a further object of this invention is to provide a sealing ring suitable for extra small bearings and miniature bearings.

A still further object of this invention is to provide a sealed rolling bearing capable of easy assembly and which satisfies all the requirements of high durability, secure sealing performance and low production costs.

SUMMARY OF THE INVENTION

According to the present invention, a peripheral edge of the retaining side of a sealing ring is bent in a direction almost parallel to the central axis of the bearing race to form a peripheral wall raised along the axis of the bearing, and the top portion of the peripheral wall is chamfered at its retaining side. A bearing ring to which the sealing ring is secured is formed or machined with a sealing groove defined in part by a wall extending obliquely to the central axis.

The bearing of this invention is assembled in such a manner that the peripheral wall of the sealing ring is deformed and retained by the sealing groove after having been pressed in.

In an alternate embodiment of the invention, a top portion of the peripheral wall of the sealing ring formed by bending is further chamfered either to have a sharp knife edge or to have a truncated profile.

The sealing ring of the present invention can be assembled to the sealing groove of the bearing race with limited face-to-face contact. Alternatively, the surface of the retaining wall of the sealing groove can be placed in contact either with the truncated tip end of the peripheral wall defined by the chamfered surface and the top surface remains without being punched off or with a sharp knife edge.

When the sealing ring is in an assembled position, the peripheral wall of the sealing ring is widened to expand obliquely or substantially parallel to the central axis and is retained by a tight contact with the remaining wall of the sealing groove of the bearing race.

In a further embodiment of this invention, a part of the peripheral wall of the sealing ring is further wedged or caulked for more secure retention.

Engagement between the peripheral wall of the sealing ring with the retaining wall may be made resiliently or rigidly.

As explained above, the sealing ring of the present invention may change its shape at the peripheral wall when it is inserted in the bearing ring without resulting in any appreciable amount of distortion of the bearing race. Furthermore, the two components can be assembled with greater security of retention by only being pressed in or with some slight wedging.

BRIEF DESCRIPTION OF THE DRAWINGS

For a more complete understanding of the present invention, reference is made to the following detailed description and accompanying drawing. In the drawing like reference characters refer to like parts throughout the several views in which.

DETAILED DESCRIPTION OF THE PREFERRED EMBODIMENTS

Figure 1:
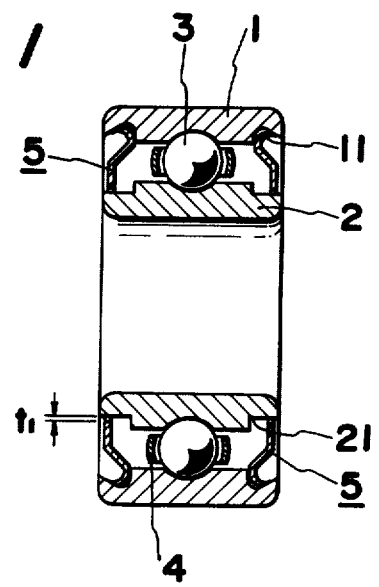
FIG. 1 is a sectional view of a first embodiment of the present invention.
Figure 2:
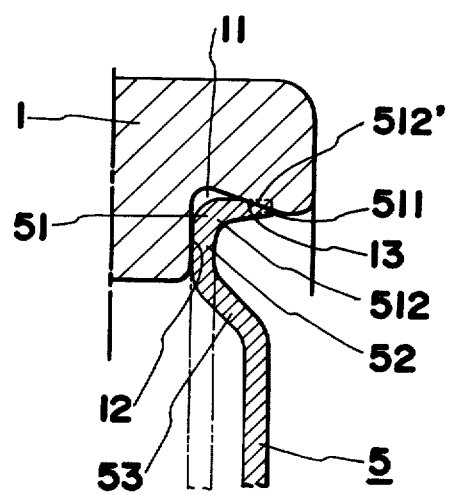
FIG. 2 is a fragmentary, enlarged sectional view of the present invention showing the relation of contact between the sealing ring and the sealing groove as shown in FIG. 1.
Figure 3:
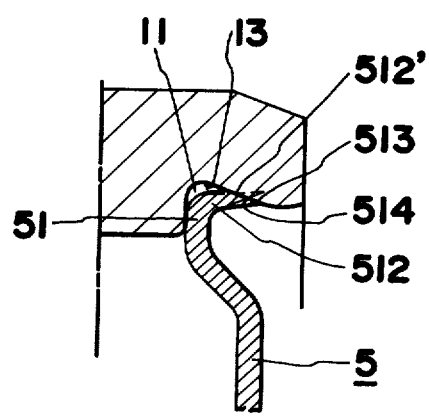
FIG. 3 is a sectional view showing another embodiment of this invention.

Referring now to the drawings and, in particular, FIGS. 1, 2 and 3, there is depicted a rolling bearing comprising: an outer race 1, an inner race 2, a ball 3, a cage 4 and a sealing ring 5. For purposes of brevity, the following explanation will be made with reference to only one side of bearing.

The outer race 1 is provided with an annular sealing groove 11 having a substantially V-shaped cross section at its bottom corner. This is defined by an annular positioning wall 12 extending substantially perpendicular to the central axis of the bearing and by an annular retaining wall 13 which extends obliquely to and away from the central axis towards the inside of the race. The annular surfact of the wall 13 may take a straight conical shape or curved shape, as desired.

As clearly shown in the enlarged view of FIG. 2, the sealing ring 5 is press formed from a metal sheet, and the configuration of the retaining side of the annular peripheral wall of the press formed sealing ring prior to assembly, shown in phantom, is similar to a trough shape in section and comprises an annular peripheral wall 51 extending toward the retaining wall 13 of the sealing groove 11; an annular bottom wall 52 formed contiguous to and tightly contactable with the positioning wall of the bearing, and an annular raised portion 53 which extends obliquely in both the radial and axial directions of the bearing.

The peripheral wall 51 has an annular chamfered portion having an annular peripheral surface 512. The wall thickness of the chamfered portion decreases gradually towards the tip end of the peripheral wall.

Chamfering can be performed either by punching and drawing subsequent to press forming or by a so-called punching and drawing operation carried out concurrent with press forming.

In the embodiment shown in FIG. 2, the tip portion of the peripheral wall is chamfered such that a small marginal edge 511 remains between the chamfered surface 512 and the annular opposite surface of the peripheral wall.

The sealing ring 5, thus, formed can be retained by the sealing groove with almost the entire peripheral surface 512 of the chamfered portion being tightly contacted with the retaining surface 13 of the annular sealing groove. Thus, there remains only a very small labyrinth clearance t(FIG. 1) between the inner periphery of the sealing ring and the stepped outer periphery of the inner race thereby ensuring a very tight seal which is necessary for this type of sealed bearing.

Assembly and retention of the sealing ring 5 in the sealing groove 11 of the bearing is performed by inserting, from the outside, the sealing ring 5 into the sealing groove 11 for tentative retention, and, then, further slightly wedging the chamfered portion 512 against the retaining wall 13 for greater security of retention.

In FIG. 2 there is depicted in phantom another type of sealing ring having only an annular peripheral wall and a flat annular inner base not having a trough shaped cross section with raised central flange.

Referring, now, to FIG. 3 there is shown another type of peripheral wall of the sealing ring and defining another embodiment of this invention. According to this embodiment the tip edge of the chamfered portion forms a sharp annular edge defining an angle formed by the chamfered surface 512 and an annular inner surface 514 of the sealing ring. In this construction, retention of the sealing ring 5 by the sealing groove 11 is performed in such a manner that the tip portion of the chamfered portion including the sharp peripheral edge is kept in tight contact with the retaining wall 13 of the outer bearing race 1. In this embodiment, the sealing ring 5 is retained by a face-to-face contact of the two components by a mere pressing-in of the sealing ring 5 into the sealing groove 11, without any subsequent wedging being applied.

Figure 4:
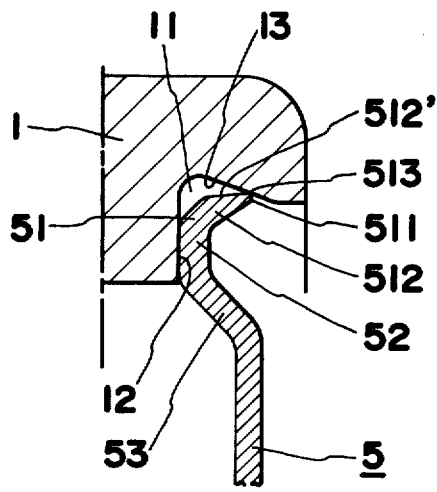
FIG. 4 is an enlarged fragmentary sectional view showing a different manner of contact between the sealing ring and the sealing groove of this invention.

FIG. 4 depicts an embodiment wherein an annular edge 513 defined by the chamfered surface 512 and the remaining top edge surface 511 is resiliently biased to the retaining wall 13 to ensure tight so-called "linear" contact therebetween.

Figure 5:
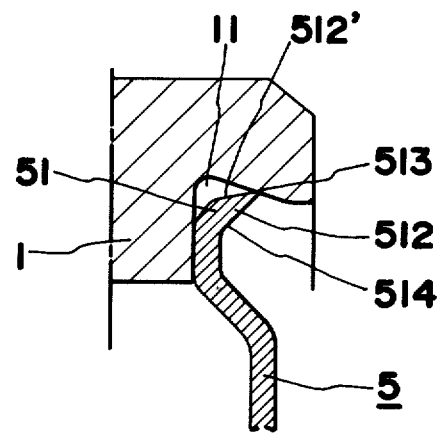
FIG. 5 is an enlarged, fragmentary sectional view showing a different manner of contact from that shown in FIG. 4, in which a sealing ring having sharp edge is placed in contact with the sealing groove.

FIG. 5 depicts a further embodiment, wherein an annular sharp peripheral edge 513 is defined by the chamfered annular surface 512 of the sealing ring and the inner annular surface 514 of the sealing ring 5 is placed in line contact with the retaining wall 13 of the sealing groove.

In order to test the efficiency of the present invention, comparison tests were conducted to determine the difference in the extent of the deformation or distortion after assembly with respect to the non-circularity of the outer races between bearings using sealing rings of this invention and bearings using conventional type retaining means.

In the comparison tests, fifty pieces each of miniature stainless steel bearings having the same dimensions were used, namely, outer diameter: 8 mm, inner diameter: 5 mm, breadth of bearing ring: 2.5 mm, wall thickness of inner race: 0.4 mm, number of balls: 13 ea. sealing ring made of stainless steel sheet of 0.1 mm thick.

Figure 6:
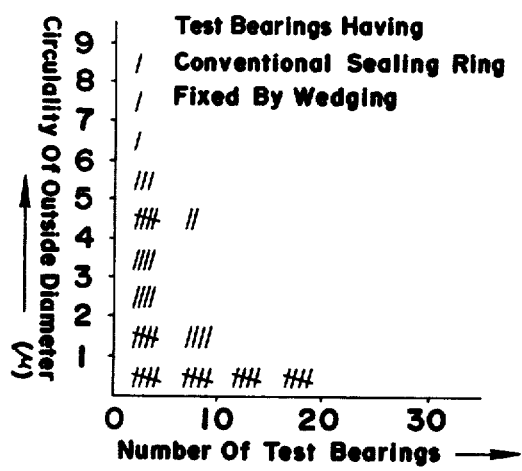
FIGS. 6, 7 and 8 are graphs showing the extent of the deformation in comparison with the bearing rings after the sealing rings have been assembled and rightened.
Figure 7:
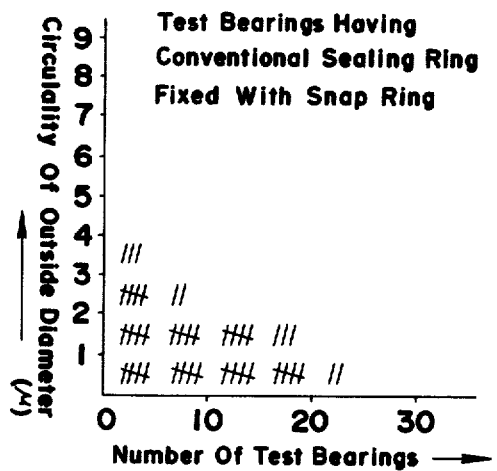
Figure 8:
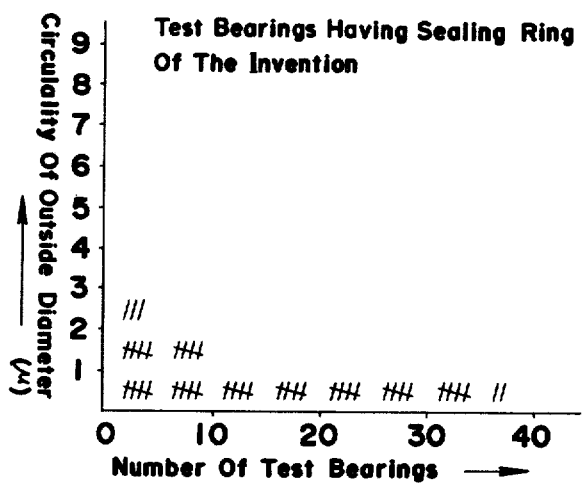

The results obtained are shown in FIGS. 6 through FIG. 8.

FIG. 6 shows the results obtained by the test bearings using the conventional method of inserting with further wedging; FIG. 7 shows the results of the test bearings using a conventional retaining snap ring and FIG. 8 shows the results obtained by the test bearings of this invention.

As can be clearly seen from FIG. 8, deviation from circularity of most of the test bearings have been subjected to assembly lies within 3 microns, and were proved to be far superior to those of the conventional type seals mentioned.

As explained above, a sealed rolling bearing of this invention having the novel sealing ring 5 which is provided with a chamfered portion 512 has, for example, an annular peripheral surface 512 the wall thickness of which gradually decreases toward its outer edge and is accompanied by a gradual decrease in rigidity. By this construction, at least a part of the chamfered periphery 512, having the reduced rigidity, firmly rests on the retaining wall 13 of the sealing groove 11 and is securedly retained thereby. Therefore, the chamfered portion of the sealing ring lightly contacts the retaining wall but with a secure retaining force. In other words, a smaller extent of compressive force applied to the sealing ring will result in relatively greater retaining force, consequently, there exists neither any fear of undesirable rotation of the sealing ring during the service, nor any possible deformation of the bearing race during its assembly. This is because the peripheral wall, particularly the chamfered portion thereof, will easily deform when it passes through the sealing groove without being accompanied by any appreciable deformation of the mating bearing race.

Owing to the above mentioned manner of inserting and retaining the sealing ring, sealing clearance t, can be maintained uniform and as small as possible.

As heretofore noted, assembly of the sealing ring can be performed merely by pushing it in from the end face of the bearing races or with further wedging. Only very small amounts of deformation of the mating bearing race occurs, thus, assuring easy assembly, high productivity, reduction in necessary control operations and lowering of assembling cost.

It should be noted that the preceding explanation has been made relative to bearings wherein the sealing rings are retained by outer races. However, it is to be understood that the present invention can be performed in any other alternative manner, for example, sealing rings may be retained by an inner race or only a single sealing ring may be used in one side of the bearing as a single sealed bearing.

Also, when chamfering of the peripheral wall, e.g. by punching, the diametral dimension can be kept accurate with minimal variation. As a result, variation in the required fitting force and in the deformation of the mating bearing race can also be maintained at a minimum.

Because of this dimensional accuracy assembly of of the sealing with constant force together with uniform and smaller sealing clearance is achieved. This, in turn, improves sealing performance of the product bearing.

Slight annular ridges or indentations may be formed when forming sealing rings by punching. However, they are effective in improving clinching of the seal rings to their mating retaining wall of the bearing race.

It is also apparent that chamfering of the peripheral wall of the sealing rings may be made in many other means such as machining, swaging or the like.

In the embodiments of the present invention, the chamfered surface of the sealing wall, i.e., surface 512, is shown to take an acute angle to the surface of sealing groove, but it is also apparent that many other modifications can be selected depending on the shape of the retaining wall to be used; requirements on retaining forces, and production means. Thus, the chamfered surface may be acute, perpendicular or obtuse retaining wall.

Sealing rings used for the test bearings for the comparison test, as previously explained, were prepared to form an inclination to the peripheral wall by taking advantage of spring back of the used material because the size of the sealing rings were too small to apply any additional forming tool.

According to the present invention, any appreciable amount of deformation or "out of circularity" in either race during assembly can be avoided. Consequently, rolling bearings of this invention satisfy both good bearing performance, such as rotation performance and low noise performance, as well as superior sealing performance.

As explained above, sealed rolling bearings of the present invention are particularly advantageous for such bearings using bearing races having small wall thicknesses which are susceptible to deformation during assembly of sealing rings and extra small bearings or miniature bearings which are obliged to use bearing races of small wall thickness.

Many additional changes in construction and widely different embodiments of this invention can be made without departing from the spirit and scope of this invention.

Having, thus, described the invention, what is claimed is:

1. An improved sealed rolling bearing of the type having at least a pair of bearing races comprising an outer race and an inner race, a bore being defined between the races, a rolling member disposed between the outer race and the inner race, a cage between the races, and an annular sealing ring provided at least at one end of the bore between said outer race and said inner race, wherein the improvement comprises: (a) one of the races having an annular sealing groove having a widened bottom portion formed therein and disposed in one end of the bore between the races, the cross section of the sealing groove comprising: (1) an annular positioning wall formed in the race and defining the bottom of the groove and being substantially perpendicular to the central axis of the bearing races; (2) an annular retaining wall formed contiguous to the positioning wall in the race, the annular surface of said retaining wall extending obliquely to the central axis and away from the outer end of the race towards the bottom of the sealing groove; and (b) the sealing ring comprises an annular peripheral wall disposed at the retaining side of the groove, the peripheral wall having a converging end tending to terminate substantially at a single point to enable the ring to be retained by the sealing groove, and
wherein the sealing ring is insertable into and firmly retained by the sealing groove by deforming the converging end without strain on the ring.

2. An improved sealed rolling bearing as claimed in claim 1, wherein the sealing ring is retained by the retaining wall of the sealing groove provided on the outer race.

3. An improved sealed rolling bearing as claimed in claim 1, wherein at least the converging end of the sealing ring is resiliently biased against the positioning wall of the sealing groove.

4. An improved sealed rolling bearing as claimed in claim 1, wherein at least the converging end of the sealing ring is non-resiliently retained by the positioning wall of the sealing groove.

5. An improved sealed rolling bearing as claimed in claim 1, wherein the surface of the converging end is formed so as to extend obliquely to the positioning wall when assembled.

6. An improved sealed rolling bearing as claimed in claim 1, wherein the converging end of the sealing ring is punch formed.

7. An improved sealed rolling bearing as claimed in claim 1, wherein the top edge of the peripheral wall of the sealing ring is formed such that the angle of the top edge is defined by the converging end, the surface at the top portion remaining without being punched off.

8. An improved sealed rolling bearing as claimed in claim 1, wherein the top edge of the peripheral wall of the sealing ring is formed such that the angle of the top edge is defined by the converging end and the opposite annular surface of the peripheral wall.

9. An improved sealed rolling bearing as claimed in claim 1, wherein at least the converging end formed on the retaining side of the peripheral wall of the sealing ring is tightly retained by a face-to-face contact with the surface of the positioning wall.

10. An improved sealed rolling bearing as claimed in claim 1, wherein the converging end of the sealing ring is maintained in tight contact with the positioning wall of the sealing groove by pressing of the sealing ring.

11. An improved sealed rolling bearing as claimed in claim 1, wherein the converging end of the sealing ring is maintained in tight contact with the positioning wall of the sealing groove by wedging subsequent to pressing of the sealing ring.

* * * * *